July 31, 1962 — R. PAPA — 3,047,183
CONTAINER CONSTITUTING A DISMANTLABLE FLOWER POT
Filed Sept. 3, 1959 — 2 Sheets-Sheet 1

INVENTOR
RENÉ PAPA

July 31, 1962   R. PAPA   3,047,183
CONTAINER CONSTITUTING A DISMANTLABLE FLOWER POT Filed Sept. 3, 1959   2 Sheets-Sheet 2

INVENTOR
RENE PAPA

3,047,183
CONTAINER CONSTITUTING A DISMANTLABLE FLOWER POT
René Papa, 51 Blvd. de Compostelle, Marseille, France
Filed Sept. 3, 1959, Ser. No. 837,801
2 Claims. (Cl. 220—4)

The sale of growing flowers commonly takes place with them in a ceramic pot containing earth. These pots are often heavy and cumbersome.

Transportation of such pots whether empty or full, is accordingly costly and difficult.

The object of the invention is to provide a very light container, constituted by dismantlable and assemblable elements, permitting easy transportation, even when they are filled with earth and plants.

In the accompanying drawings, which show an embodiment of the invention:

Two wall elements (FIGS. 1 and 2) are constituted by pairs 1, 2 and 3, 4 of walls made of rigid sheet material.

Figure 1:
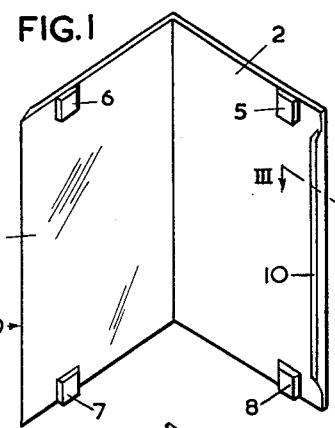
FIGURES 1 and 2 show in perspective two wall portions.
Figure 2:
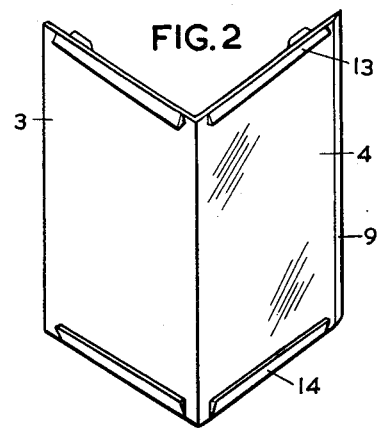

On the internal surface of the walls are disposed locating tenons 5, 6, 7, 8. The edge 9 of each wall element, FIGURES 1, 2 and 3, is chamfered to fit into a longitudinal vertical groove 10 on the other element.

Figure 3:
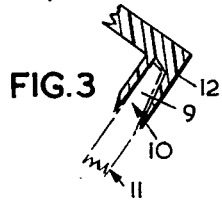
FIGURE 3 is a section, to a larger scale, taken on the line III—III of FIG. 1, to show a detail of interfitting edges.

The vertical groove 10 has the same cross-section as the edge 9, and the adjacent portions 11, 12 respectively of the walls 4 and 2 have their external surface in the same plane, (see FIG. 3).

The external surfaces of each wall is provided with shoulders 13, 14 of triangular cross-section.

Figure 4:
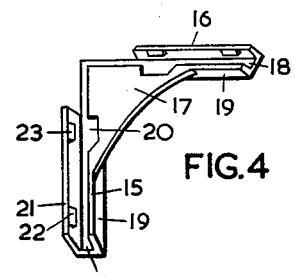
FIGURE 4 is a perspective view from below and to a larger scale, of a locking element for positioning at upper opposite corners of the wall assembly.
Figure 5:
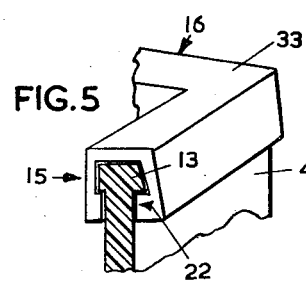
FIGURE 5 shows to a larger scale, the manner in which the locking element edges on the upper edges of the wall elements.

The corner locking element, FIGURES 4 and 5, are formed by channels 15, 16 connected at right angles by a web 17. The base 18 of each channel is at a right angle to their wall 19 which has a notch 20 inclined at one end to correspond to the tenons 5 and 6.

Their rigid outer wall 21 is inclined outwardly with respect to the wall 19, and carries detents 22, 23 for hooking over the shoulders 13.

Figure 7:
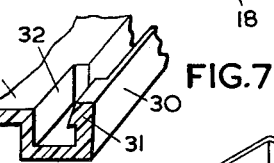
FIGURE 7 is a vertical section taken on the line VII—VII of FIG. 6, to show on a larger scale a detail of the bottom of the flower pot.
Figure 6:
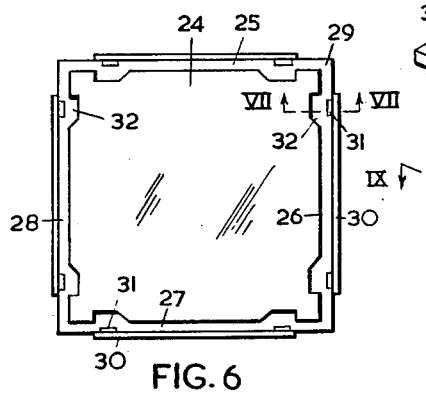
FIGURE 6 shows in plan on the same scale as FIGS. 1 and 2, the bottom portion of the device.

The bottom, FIGURES 6 and 7, is formed by a plane base 24, encompassed by the recesses 25, 26, 27, 28 having the same cross-section as the channels of the corner (FIGURE 4), with clear parts 29 at each angle.

The walls 30 lean slightly outwardly with respect to the normal through the plane of the bottom 24, and carry detents 31 for engagement on the shoulder 14. Notches 32 correspond to the tenons 8 and 7 in FIGURE 1.

The elements shown in FIGS. 1 and 2 may conveniently be stacked one upon another, and are very thin and light in weight.

The user is able to assemble the pot quickly by putting the edge 9 of one wall element into the vertical slot 10 of the other.

In order to retain the elements assembled together the lower edges are snapped into the channels 24, 25, 26, 27 of the bottom.

The four tenons 7, 8 of the four walls enter the locating notches 32. The locking detents 31 ride over the shoulders 14.

The slightly outwardly inclined position 30 facilitates this insertion of the bottom edges of the walls. The slight resilience of the plastic material used ensures that the detent 31 is pressed onto the upper surface of the shoulders 14.

Figure 8:
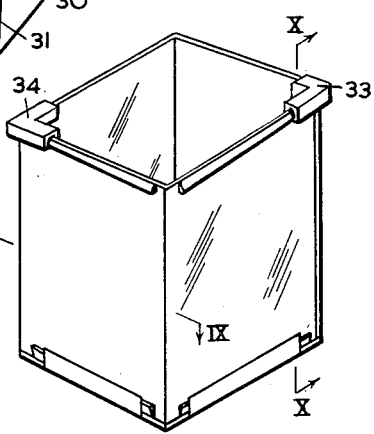
FIGURE 8 is a view of an assembled flower pot, seen in perspective and to the same scale as FIGS. 1 and 2.
Figure 10:
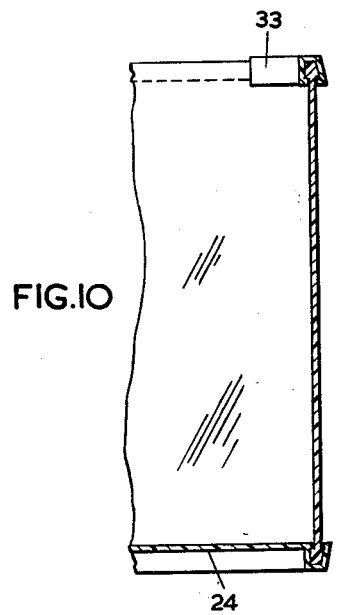
FIGURE 10 is a vertical section to a larger scale, taken on the line X—X of FIG. 8.
Figure 9:
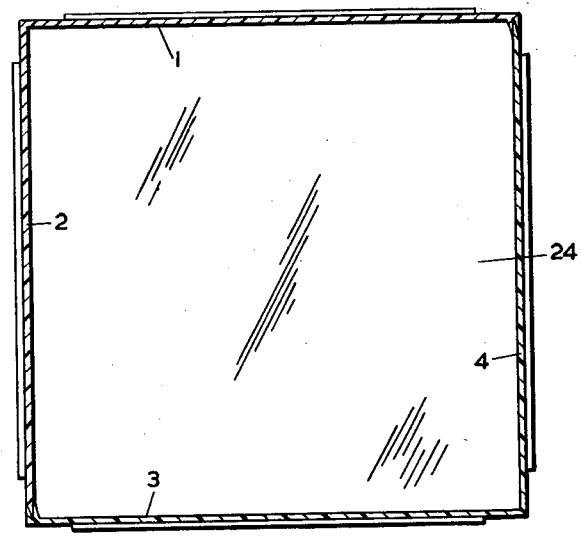
FIGURE 9 is a horizontal section, to a larger scale, taken on a plane indicated by the line IX—IX of FIG. 8.

One opposite pair of corners of the assembly are jointed by the elements 33, 34 (FIGURES 8, 4 and 5), the locking system of which is identical with that of the bottom (FIGURE 6).

The channels 15, 16 are engaged over the upper edges of the adjoining walls so as to hold the edge 9 fully and tightly in the groove 10.

The tenons 5, 6 enter into the locating notches 20 and the detents 22, 23 catch under the lower surface of the upper shoulders 13.

The slight outward inclination of the wall 21, and its resilience facilitate engagement of the corner pieces in position.

I claim:

1. A dismantlable flowerpot comprising two identical wall elements each including a pair of plane rectangular walls rigidly joined at one of their side edges and disposed at a right angle to each other, the other side edge of one of the walls being tapered to form a tongue and the other side edge of the other of the walls being provided with a groove of the same cross-section as the tongue, the two wall elements being assembled with the tongue of each in the groove of the other to constitute in assembly a body of rectangular horizontal section for the flowerpot, a bottom for the flowerpot comprising a plane rectangular base having adjacent its edges and in its upper surface a set of four channels into which the bottom edges of the assembled wall elements are engaged, an external shoulder on each wall adjacent to but spaced from the bottom end of said wall, detent means in and spaced from the bottom of the channels of the base, said detents having the shoulder of the respective walls engaged beneath them, the base being resilient whereby the shoulders may ride past the detent means by resilient deformation of the base, two corner pieces including channels engaged onto the top edges of the assembled wall elements, a further shoulder positioned along the upper edge of each wall, and detents disposed in each of the channels of the corner pieces, the detents being engaged past and abutting against the further shoulder at its side remote from the upper edge of the wall, said corner pieces including notches adjacent their channels, and tenons on the walls at their top edge engaged into said notches to key the walls against longitudinal movement with respect to the corner pieces.

2. A dismantlable flowerpot, as claimed in claim 1, wherein the base has locating notches contiguous with its channels, the walls being provided with tenons adjacent their bottom edges seated into said locating notches.

References Cited in the file of this patent

UNITED STATES PATENTS

| 2,643,788 | Burrows | June 30, 1953 |
| 2,823,821 | Frater et al. | Feb. 18, 1958 |

FOREIGN PATENTS

| 808,492 | Great Britain | Feb. 4, 1959 |